(12) United States Patent
Ishimasa

(10) Patent No.: US 7,652,834 B2
(45) Date of Patent: Jan. 26, 2010

(54) DRIVING UNIT FOR OPTICAL PICK-UP INCLUDING LENS

(75) Inventor: Toru Ishimasa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 147 days.

(21) Appl. No.: 11/892,371

(22) Filed: Aug. 22, 2007

(65) Prior Publication Data

US 2008/0123201 A1     May 29, 2008

(30) Foreign Application Priority Data

Aug. 24, 2006   (JP) .............................. 2006-227488

(51) Int. Cl.
*G02B 7/02* (2006.01)
(52) U.S. Cl. ..................... 359/823; 359/819
(58) Field of Classification Search ......... 359/822–823, 359/829, 819, 811, 813; 411/427–438; D8/397; G02B 7/02

See application file for complete search history.

(56) References Cited

U.S. PATENT DOCUMENTS

D48,602  S  *  2/1916  McCarthy ................... D8/397
4,397,437 A  *  8/1983  Madej .......................... 248/72
5,020,953 A  *  6/1991  Wada .......................... 411/247
6,650,488 B2 * 11/2003  Onda .......................... 359/823
6,980,371 B2 * 12/2005  Makii et al. ................. 359/823
7,035,535 B2 *  4/2006  Nomura ....................... 396/73
7,161,751 B2 *  1/2007  Hasegawa et al. ........... 359/829

FOREIGN PATENT DOCUMENTS

JP          10-20177          1/1998
JP        2004-341392        12/2004

* cited by examiner

*Primary Examiner*—Darryl J Collins
*Assistant Examiner*—Zachary Wilkes
(74) *Attorney, Agent, or Firm*—Wenderoth, Lind & Ponack L.L.P.

(57) ABSTRACT

A lens driving unit includes a housing, a lead screw extending in an optical axis direction to be rotated and driven by a driving source, a nut screwed with the lead screw, a lens frame holding a lens and supported movably in the optical axis direction, a contact portion provided at the lens frame to be brought into contact with the nut from one end side of the optical axis direction, and a spring urging so that the nut and the contact portion are brought into contact with each other. The nut is engaged with a guide slit unrotatably with respect to the housing, and the contact portion and the nut are formed so that they are brought into partial contact with each other in a projected plane of the nut in the optical axis direction.

7 Claims, 6 Drawing Sheets

DRIVING UNIT FOR OPTICAL PICK-UP INCLUDING LENS

BACKGROUND OF THE INVENTION

1. Field of the Invention

The present invention relates to a lens driving unit (driving unit for optical pick-up including lens) for driving a lens frame holding a lens in an optical axis direction by a screw feed mechanism of a lead screw and a nut screwed therewith.

2. Description of the Related Art

A well-known conventional lens driving unit includes a base (or a case), a lens frame holding a lens, a guide shaft fixed to the base so as to guide the lens frame in an optical axis direction, a driving motor fixed to the base, a lead screw directly connected to the driving motor and rotated and driven, a nut held unrotatably with respect to the lens frame (or its arm) and screwed with the lead screw, a coil spring urging the nut toward the lens frame or the lens frame toward the nut and the like. The lens frame is moved in the optical axis direction by rotating the lead screw by the driving motor so as to screw-feed the nut (see Unexamined Japanese Patent publication No. 10-20177, Unexamined Japanese Patent Publication No. 2004-341392, for example).

However, in the above conventional units, since a rotation stopper for the nut is directly engaged with a stopper of the lens frame, and an end face of the nut is held in direct contact (plane contact on the entire region) with a holding face of the lens frame (arm), vibration or the like is transmitted from the nut to the lens frame through the plane contact on the entire region between the nut end face and the holding face by assembly tolerance between the lead screw and the nut, load fluctuation caused by machining tolerance or the like of a screw portion formed on them, rotation driving force of the driving motor and its reaction and the like, which causes a problem of vibration of the lens frame in a direction perpendicular to the optical axis.

As a result, in an optical pick-up unit for CD or DVD to which this unit is applied, when the lens frame is to be moved in the optical axis direction during reading or writing of data on a disk, the optical axis of the lens is fluctuated and a focus on the disk can not be kept constant easily.

SUMMARY OF THE INVENTION

The present invention has been made in view of the above circumstances. It is therefore an object of the present invention to provide a lens driving unit (driving unit for optical pick-up including lens) which can drive a lens frame (and a lens in the frame) stably and accurately in an optical axis direction without vibration by preventing transmission of vibration or the like from the nut to the lens frame.

A lens driving unit of the present invention in order to achieve the above object includes a housing, a driving source fixed to the housing, a lead screw extending in an optical axis direction so as to be rotated and driven by the driving source, a nut screwed with the lead screw, a lens frame holding the lens and movably supported in the optical axis direction, a contact portion provided at the lens frame to be brought into contact with the nut from one end side of the optical axis direction, and a spring for urging so that the nut and the contact portion are brought into contact with each other. The nut is unrotatably engaged with the housing. The contact portion and the nut are formed so as to be brought into partial contact with each other in a projected plane of the nut in the optical axis direction.

According to this structure, when the lead screw is rotated by a rotation driving force of the driving source, the nut is screw-fed in the optical axis direction while its rotation is regulated by the housing, and the lens frame is moved in the optical axis direction following the nut.

Here, since the nut is unrotatably engaged with the housing and it is formed so as to be brought into not complete contact (plane contact in the entire region) but partial contact with the contact portion of the lens frame in the projected plane in a thrust direction (optical axis direction), even if the nut generates slight vibration through the lead screw, the vibration is received by the housing and because of the partial contact with the contact portion, the vibration is not transmitted to the lens frame. That is, the lens frame (lens) is moved stably in the optical axis direction without vibration. By this arrangement, when this lens driving unit is mounted on an optical pick-up unit, the optical axis is not fluctuated even during driving of the lens, whereby the focus can be kept constant.

In the above-mentioned structure, the housing may have a lengthy guide slit in the optical axis direction, the nut may have a rotation stopper projection inserted into the guide slit, the contact portion may have an annular projection portion projecting annularly in the optical axis direction, and the nut may have a flat face in contact with the annular projection portion.

According to this structure, only by inserting the rotation stopper projection of the nut into the guide slit of the housing, the nut can be engaged with the housing unrotatably, and only by bringing the flat face of the nut into contact with the annular projection portion formed at the contact portion of the lens frame, the nut and the contact portion can be brought into partial contact (here, annular linear contact) with each other, thus simplification of structure, facilitation of assembling and the like can be achieved.

In the above-mentioned structure, the housing may have a lengthy guide slit in the optical axis direction, the nut may have a rotation stopper projection inserted into the guide slit, the nut may have an annular projection portion projecting annularly in the optical axis direction, and the contact portion may have a flat face in contact with the annular projection portion.

According to this structure, only by inserting the rotation stopper projection of the nut into the guide slit of the housing, the nut can be engaged with the housing unrotatably, and only by bringing the annular projection portion of the nut into contact with the flat face formed at the contact portion of the lens frame, the nut and the contact portion can be brought into partial contact (here, annular linear contact) with each other, thus simplification of structure, facilitation of assembling and the like can be achieved.

In the above-mentioned structure, the annular projection portion provided at the nut may be formed on both faces of the nut in the optical axis direction.

According to this structure, since the nut does not have directivity, misassembling can be prevented at assembling of the nut.

In the above-mentioned structure, the contact portion or the annular projection portion formed at the nut may be formed with the section curved in the convex state.

According to this structure, while increase in the contact face pressure between the nut and the contact portion is restricted, transmission of vibration or dragging force and the like from the nut to the contact portion (lens frame) can be effectively prevented.

DETAILED DESCRIPTION OF THE INVENTION

The best mode for carrying out the present invention will be described below referring to the attached drawings.

Figure 1:
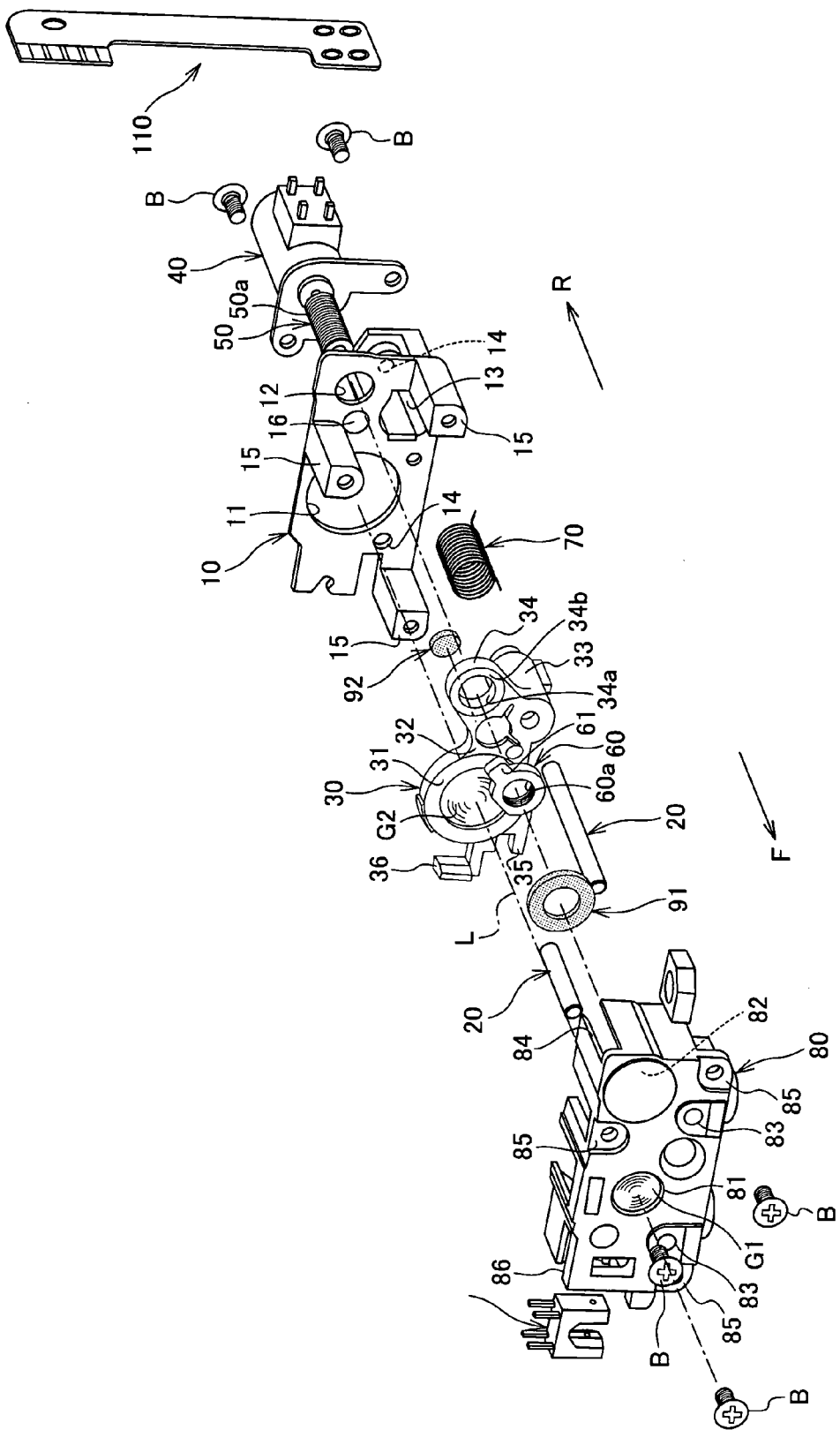
FIG. 1 is an exploded perspective view illustrating an embodiment of a lens driving unit according to the present invention.
Figure 2:
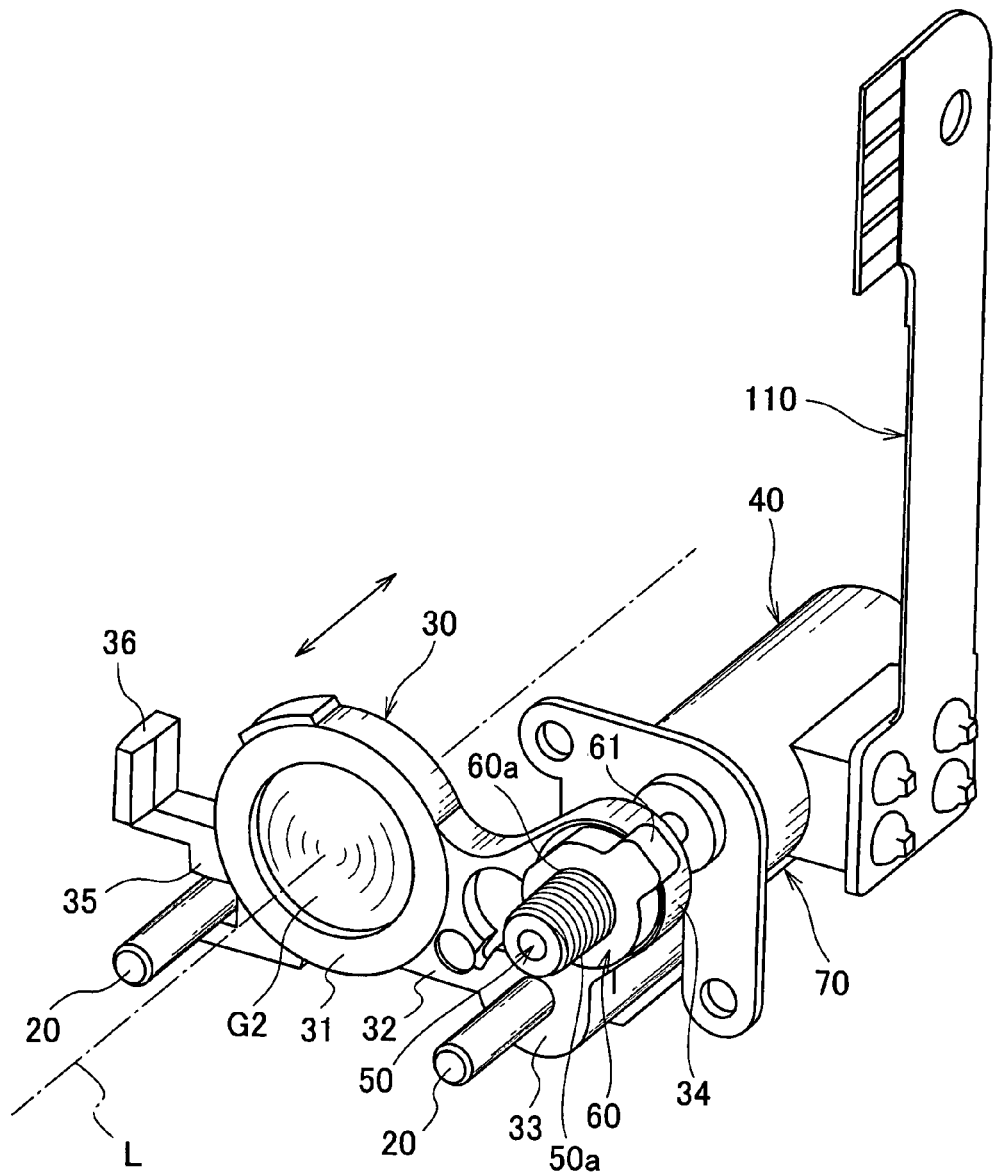
FIG. 2 is a perspective view illustrating a part of the unit shown in FIG. 1.

This lens driving unit includes, as shown in FIGS. 1 and 2, a base 10 constituting a part of a housing, two guide shafts 20 fixed to the base 10 and extending in an optical axis direction L, a lens frame 30 holding a lens G2 and supported by the guide shafts 20 movably in the optical axis direction L, a driving motor 40 as a driving source fixed to the base 10, a lead screw 50 directly connected to the driving motor 40 and extending in the optical axis direction L, a nut 60 screwed with the lead screw 50 and brought into contact with the lens frame 30, a spring 70 urging the lens frame 30 toward the nut 60, a cover 80 as a part of the housing connected to the base 10 so as to cover the lens frame 30, buffer rubbers 92, 91 affixed to a front face of the base 10 and an inner face of the cover 80, respectively, a detection sensor 100 for detecting an initial position of the lens frame 30, a flexible wiring 110 connected to the driving motor 40 and the like.

The base 10 is molded from a resin material and as shown in FIG. 1, formed substantially in a rectangular shape, and is provided with a circular opening 11 through which light passes, a circular hole 12 through which the lead screw 50 passes, a holding portion 13 for accommodating and holding one end side of the spring 70, a fitting hole 14 for fitting one end of the guide shaft 20, a mounting boss 15 for fastening the cover 80 with a screw B and the like.

The cover 80 is formed in a box state made of a resin material substantially in a rectangular shape and opened rearward, and is provided with a circular opening 81 holding a lens G1 rearward and through which light passes, a circular inner wall portion 82 opposite to a tip end of the lead screw 50 and to which the buffer rubber 91 is affixed, a fitting hole 83 fitting the other end of the guide shaft 20, a guide slit 84 into which a rotation stopper projection 61 of the nut 60, which will be described later, is inserted, a joining portion 85 to be joined to a mounting boss 15 of the base 10 through the screw B, a recess portion 86 in which the detection sensor 100 is installed and the like.

The guide slit 84 is formed, as shown in FIG. 1, to extend lengthy in the optical axis direction L and to be opened toward a rear R in the optical axis direction L in a corner region of the cover 80.

The guide slit 84 receives the rotation stopper projection 61 of the nut 60, which will be described later, so as to engage the nut 60 unrotatably. Here, since the guide slit 84 is opened toward the rear R in the optical axis direction L, only by inserting the rotation stopper projection 61 of the nut 60, which will be described later, into the guide slit 84 from the rear R, the nut 60 can be engaged with the cover 80 (housing) easily and unrotatably.

Also, since the guide slit 84 is formed with respect to the corner region (side wall face) of the cover 80, the cover 80 can be molded in a case shape and the guide slit 84 can be molded integrally at the same time, and simplification of the structure, reduction of the part number, cost reduction and the like can be achieved as compared with a case where another member forming the guide slit is joined to the cover 80 or the base 10.

The two guide shafts 20 are formed, as shown in FIGS. 1 and 2, from a metal material with a circular section so as to extend in the optical axis direction L, and their one ends are fitted and fastened to the fitting hole 14 of the base 10, while the other ends are fitted and fastened to the fitting hole 83 of the cover 80. One guide shaft 20 guides the lens frame 30 in the optical axis direction L, while the other guide shaft 20 guides the lens frame 30 in the optical axis direction L and regulates rotation of the lens frame 30 around the optical axis direction L.

Figure 3:
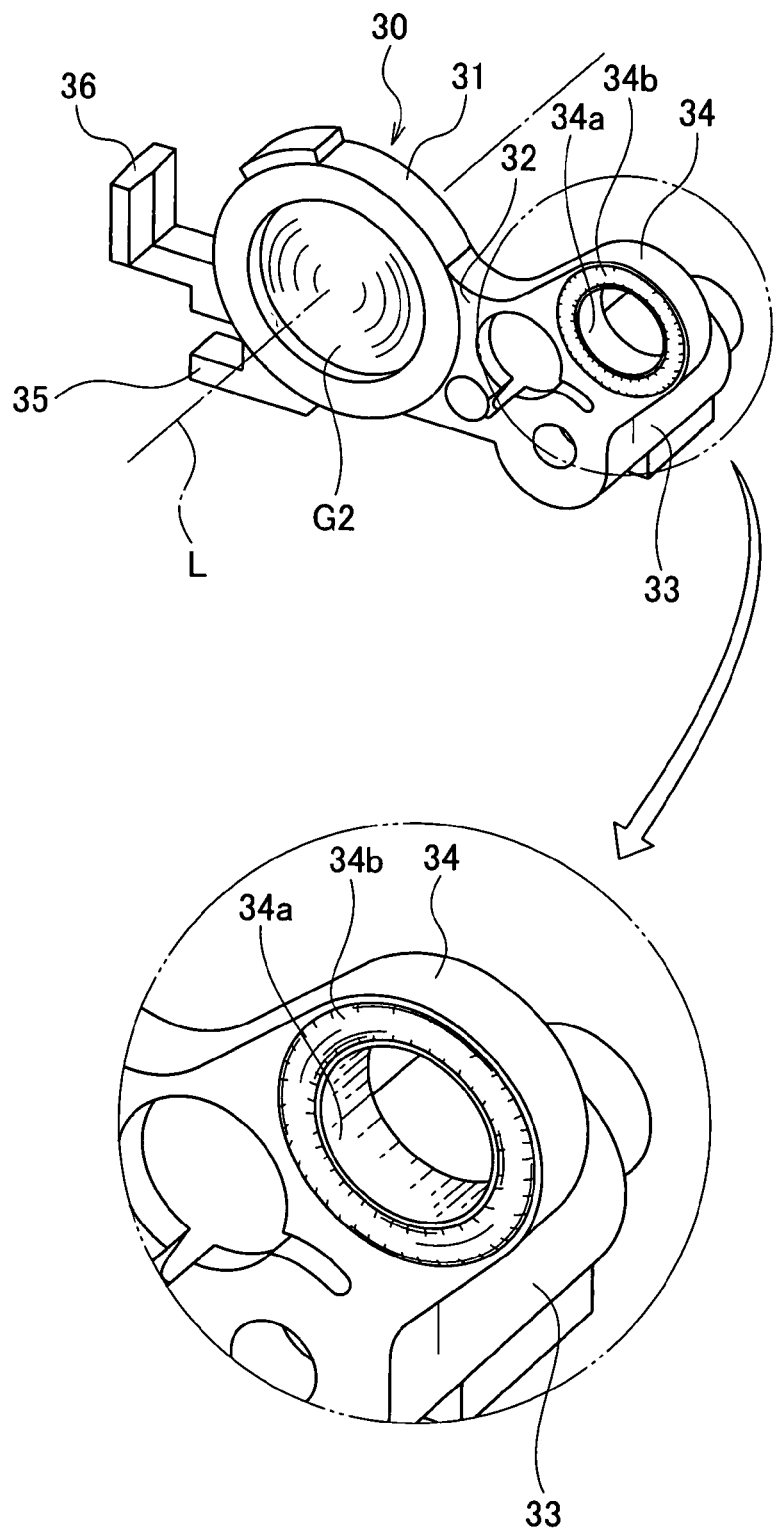
FIG. 3 is a perspective view illustrating a lens frame included in the unit shown in FIG. 1 and an enlarged perspective view enlarging a part thereof.

The lens frame 30 is formed from a resin material and is provided with, as shown in FIGS. 1 to 3, an annular portion 31 holding a lens G, an extension portion 32 extending in one direction in the radial direction from the annular portion 31, a connection portion 33 formed so as to extend in the optical axis direction L from the extension portion 32 and connecting the guide shaft 20 by slidable fitting, a contact portion 34 formed at a part of the extension portion 32 so as to pass the lead screw 50 and to be brought into contact with the nut 60, a U-shaped connection portion 35 extending from the annular portion 31 on the side opposite to the extension portion 32 and connecting the guide shaft 20 by slidable fitting, a to-be-detected piece 36 formed extending from the vicinity of the connection portion 35 and detected by the detection sensor 100 and the like.

The contact portion 34 defines a through-hole 34a through which the lead screw 50 is passed without contact and also defines an annular projection portion 34b projecting annularly toward a front F in the optical axis direction L so that it is brought into contact with a flat face 62 of the nut 60, which will be described later, from a rear R in the optical axis direction L as shown in FIGS. 1 to 4. Here, the annular projection portion 34b is formed with the section curved in the convex state (substantially in the arc state).

The contact portion 34 is formed so that when it is brought into contact with the nut 60 from the rear in the optical axis direction L, a region most projecting to the flat face 62 of the nut 60, which will be described later, in the annular projection portion 34b is brought into linear contact annularly, that is, it is brought into partial contact in the projected plane of the nut 60 in the optical axis direction L.

Also, since the section of the annular projection portion 34b is formed to be curved in the convex state (substantially in the arc state), transmission of vibration or dragging force from the nut 60 to the contact portion 34 (lens frame 30) can be effectively prevented while increase in the contact surface pressure between the nut 60 and the like and the contact portion 34 is restricted.

The driving motor 40 is a stepping motor which can be rotated in steps by a predetermined angle and which is fixed to the back face of the base 10 with the screw B. The driving motor 40 exerts the rotation driving force to the lead screw 50 directly connected thereto.

Figure 4:
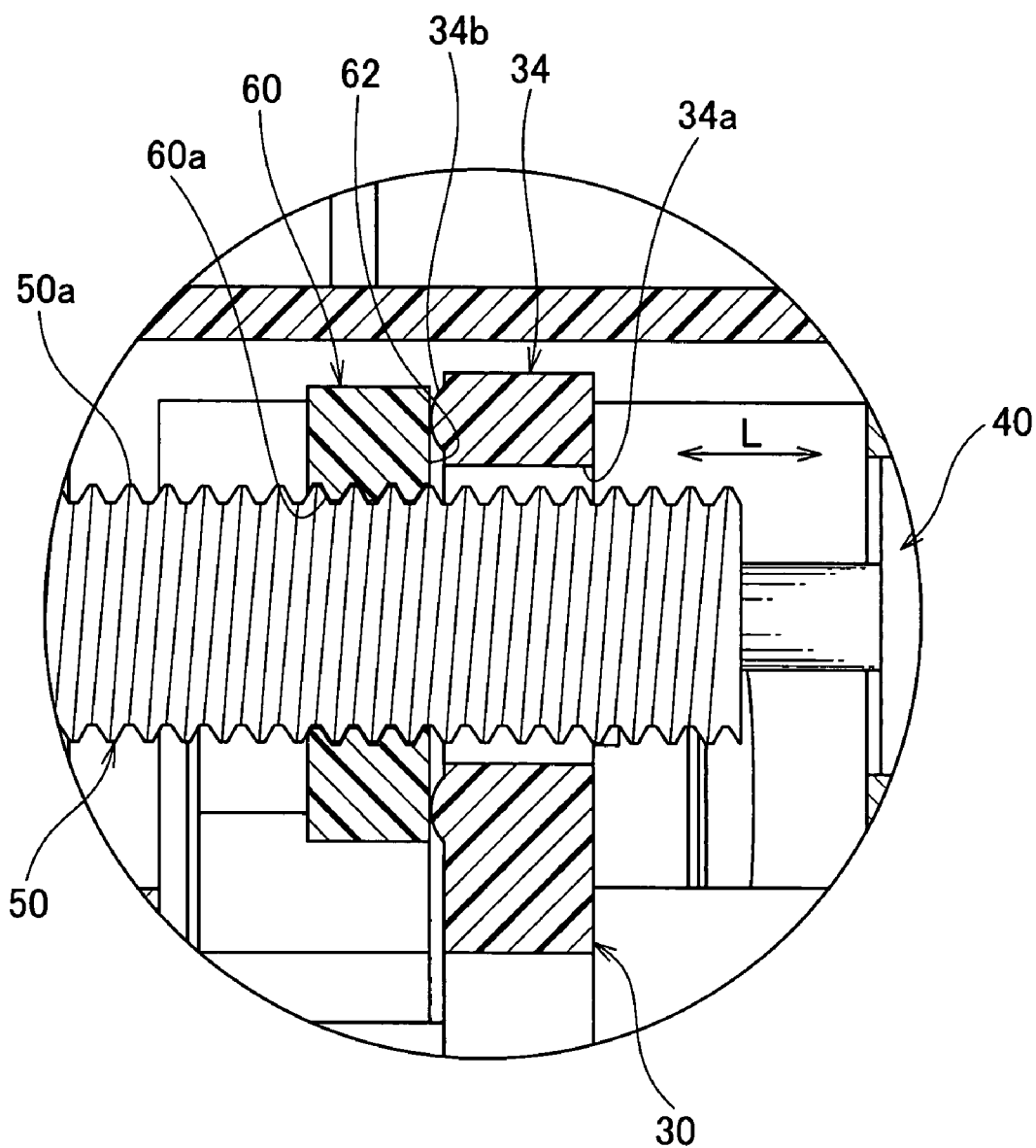
FIG. 4 is a partial sectional view illustrating a part of the unit shown in FIG. 1 in an enlarged manner.

The lead screw 50 is formed from a metal material as shown in FIGS. 1, 2, and 4 to be extended in the optical axis direction L, and is provided with a male screw 50a over a predetermined region of its outer circumferential face.

The nut 60 is formed from a synthetic resin material and as shown in FIGS. 1, 2, and 4, and is provided with a female screw 60a screwed with the male screw 50a of the lead screw 50, a rotation stopper projection 61 projecting in the radial direction from its outer circumferential face and forming a width capable of insertion into the guide slit 84, the flat face 62 to be brought into contact with the contact portion 34 of the lens frame 30 and the like.

The rotation stopper projection 61 has such a width dimension to prevent the nut 60 from being rotated around the lead screw 50 and generating rattling, and is formed to be slidable in the longitudinal direction (optical axis direction L) of the guide slit 84.

The spring 70 is a compression-type coil spring formed in the coil state as shown in FIG. 1 with one end of the spring locked by a lock portion (not shown) formed at the holding portion 13 of the base 10 and the other end locked by a lock portion (not shown) formed in the vicinity of the connection portion 33 of the lens frame 30 and is mounted in the compressed state with a predetermined compression margin.

Therefore, the spring 70 exerts an urging force to urge the lens frame 30 toward the front F in the optical axis direction L and to press the contact portion 34 (annular projection portion 34b) of the lens frame 30 onto (the flat face 62 of) the nut 60.

The buffer rubber 91 is affixed to the inner wall portion 82 of the cover 80, while the buffer rubber 92 is affixed to a front face portion 16 of the base 10.

When the lens frame 30 is moved to a moving end of the front side F in the optical axis direction L, the nut 60 is brought into contact with the buffer rubber 91 and the impact is absorbed, while when the lens frame 30 is moved to a moving end of the rear side R in the optical axis direction L, the lens frame 30 is brought into contact with the buffer rubber 92 and the impact is absorbed.

The detection sensor 100 is a transmission-type optical sensor having a light-emitting element and a light-receiving element and is mounted to the recess portion 86 of the cover 80. The detection sensor 100 detects the initial position (home position) of the lens frame 30 based on presence or absence of the to-be-detected piece 36 of the lens frame 30.

The flexible wiring 110 is electrically connected to a terminal of the driving motor 40 in order to drive and control the driving motor 40.

Next, assembling of the unit will be described. First, the driving motor 40 to which the lead screw 50 is directly connected is fastened and fixed to the base 10 with the screw B, and the guide shafts 20 are fitted and fixed to the fitting holes 14 of the base 10.

Then, the guide shafts 20 are inserted through the connection portions 33, 35 of the lens frame 30 and while the lens frame 30 is assembled movably in the optical axis direction L, the spring 70 is compressed and assembled between the holding portion 13 and the connection portion 33.

Then, while the lens frame 30 is pushed into the rear in the optical axis direction L by a predetermined amount, the nut 60 is brought closer from the front and screwed with the lead screw 50 only by a predetermined amount. And the rotation stopper projection 61 of the nut 60 is inserted into the guide slit 84, and while the other end of the guide shaft 20 is fitted in the fitting hole 83, the joining portion 85 is brought into contact with the mounting boss 15 and by fastening them with the screw B, the cover 80 is firmly connected to the base 10.

In this way, in assembling of the unit, only by preparing and fitting the spring 70, the lens frame 30, the nut 60, and the cover 80 sequentially from the front in the optical axis direction L, they can be assembled easily and surely. Therefore, the assembling work can be carried out easily and rapidly, whereby the productivity can be improved.

Next, operation of the unit will be described.

First, when the lens frame 30 is located in the front (initial position) in the optical axis direction L, the detection sensor 100 detects the to-be-detected piece 36.

And when the driving motor 40 is rotated positively, the lead screw 50 is rotated, the rotation stopper projection 61 is guided only in the optical axis direction L while being regulated unrotatably by the guide slit 84 of the cover (housing) 80, and the nut 60 is moved toward the rear R in the optical axis direction L by the screw-feed action.

Then, due to contact between the nut 60 and the contact portion 34, the lens frame 30 is moved toward the rear R in the optical axis direction L together with the nut 60 against the urging force of the spring 70.

Subsequently, by controlling a driving amount of the lens frame 30 as appropriate by counting the number of steps from start of the driving motor 40, the lens frame 30 is positioned at a desired position.

On the other hand, when the driving motor 40 is rotated reversely, the lead screw 50 is rotated, the rotation stopper projection 61 is guided only in the optical axis direction L while being regulated unrotatably by the guide slit 84 of the cover (housing) 80, and the nut 60 is moved toward the front F in the optical axis direction L by the screw-feed action.

Then, since the nut 60 is brought into contact with the contact portion 34 all the time by the urging force of the spring 70, the lens frame 30 follows the nut 60 (together with the nut 60) and moves toward the front F in the optical axis direction L and is positioned at a desired position by controlling the driving amount as appropriate and is further moved to the front F and is returned to the initial position.

In the above driving operation, since the nut 60 is unrotatably engaged with the cover (housing) 80 and is formed so as to be not in total contact but in partial contact with the contact portion 34 of the lens frame 30 in the thrust direction (optical axis direction L) in its projected plane, even if the nut 60 generates slight vibration due to load fluctuation caused by machining tolerance or the like of the male screw 50a and the female screw 60a, a rotational force and its reaction force of the lead screw 50 and the like, the vibration is received by the cover (housing) 80 or transmission of the force from the flat face 62 to the contact portion 34 (annular projection portion 34b) is restricted or prevented and not transmitted to the lens frame 30.

That is, according to this lens driving unit, while simplification of the structure, size reduction and the like are achieved, the lens frame 30 (lens G2) is moved stably in the optical axis direction L without vibration. Therefore, when the lens driving unit is mounted on an optical pick-up unit or the like, the optical axis is not fluctuated even during driving of the lens, whereby the focus can be kept constant.

Figure 5A:
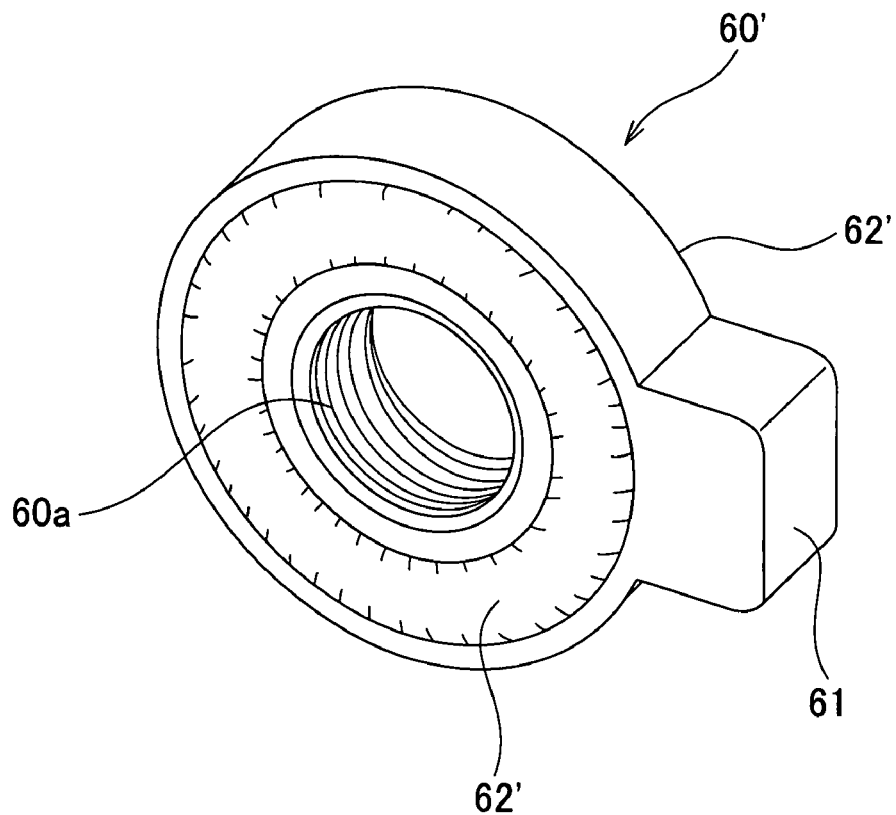
FIG. 5A is a perspective view of a nut constituting a part of the unit in another embodiment of a lens driving unit according to the present invention and FIG. 5B is a sectional view of the nut shown in FIG. 5A.
Figure 5B:
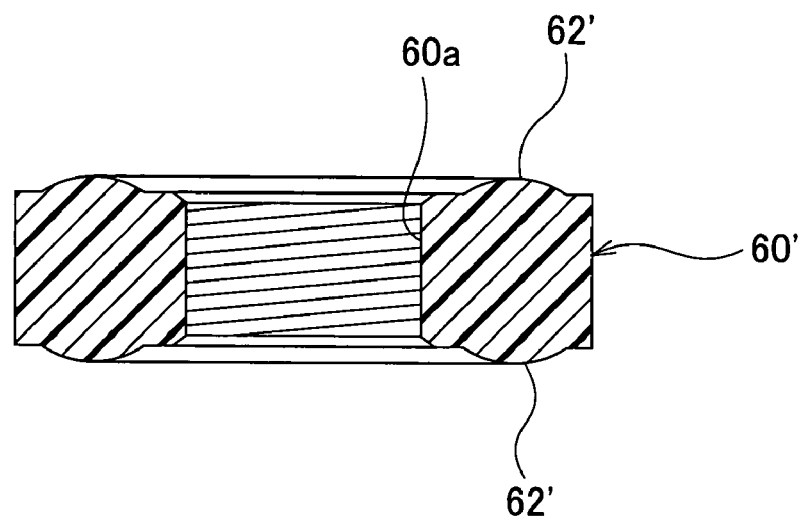
Figure 6:
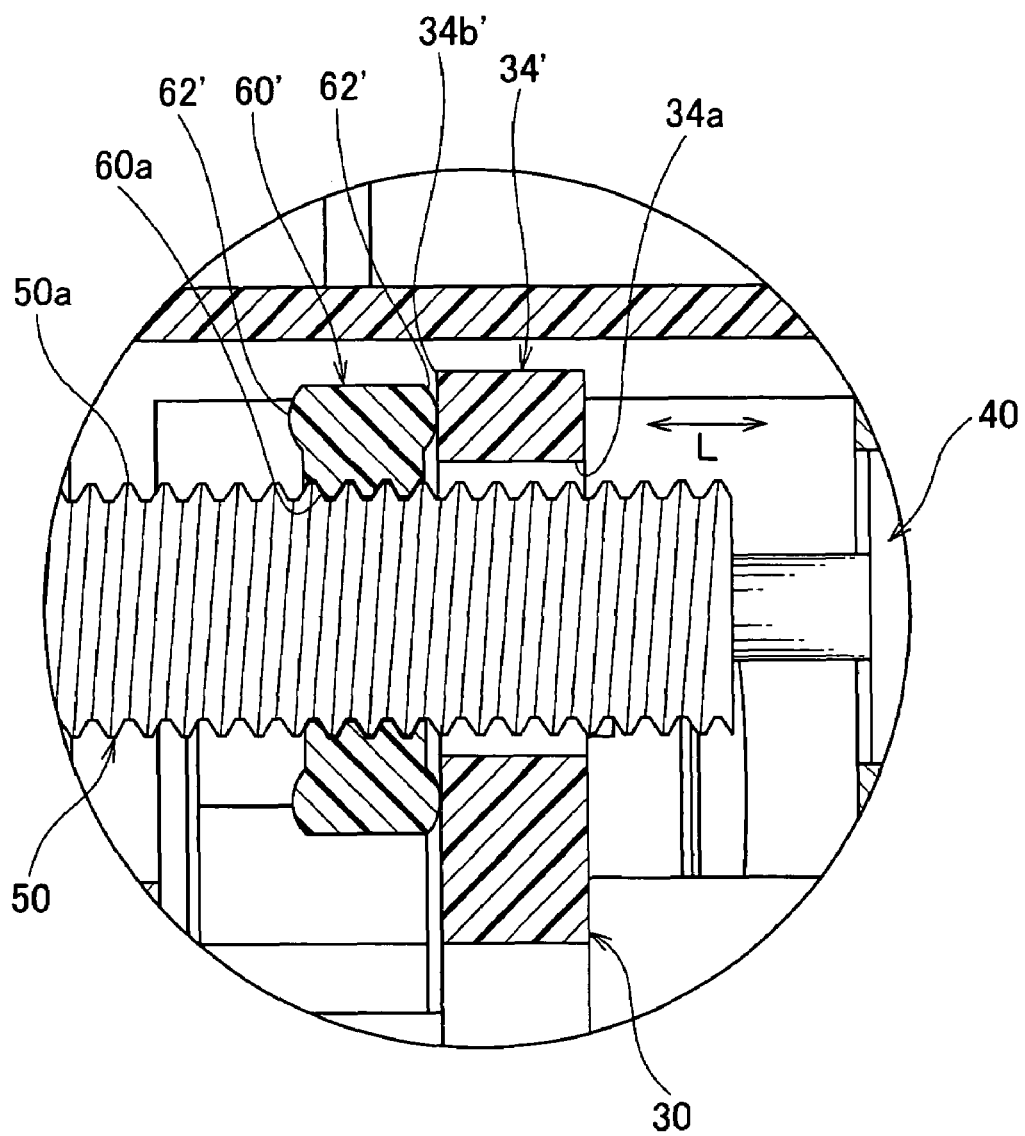
FIG. 6 is a partial sectional view illustrating a part of the unit provided with the nut shown in FIGS. 5A and 5B in an enlarged manner.

FIGS. 5A, 5B and 6 show another embodiment of the lens driving unit according to the present invention, and the same structure as in the above-mentioned embodiment is given the same reference numerals and the description is omitted.

In this embodiment, a contact portion 34' of the lens frame 30 defines a flat face 34b' in contact with a nut 60', and the nut 60' defines an annular projection portion 62' projecting annularly in the optical axis direction L on both faces of the optical axis direction L.

Here, the annular projection portion 62' is formed with the section curved in the convex state (substantially in the arc state).

That is, the contact portion 34' is formed so that when the contact portion 34' is brought into contact with the nut 60' from the rear R in the optical axis direction L, the flat face 34b' is brought into linear contact annularly with a region most projecting in the annular projection portion 62' of the nut 60', that is, into partial contact in the projected plane of the nut 60' in the optical axis direction L.

Also, since the section of the annular projection portion 62' is formed to be curved in the convex state (substantially in the arc state), transmission of vibration or dragging force or the like from the nut 60' to the contact portion 34' (lens frame 30) can be effectively prevented while increase in the contact surface pressure between the nut 60' (annular projection portion 62') and the contact portion 34' (flat face 34b') is restricted.

Moreover, since the annular projection portion 62' provided at the nut 60' is formed on both faces of the nut 60' in the optical axis direction L, the nut 60' does not have directivity, and misassembling can be prevented when the nut 60' is assembled.

In the unit according to this embodiment, similarly to the above, only by inserting the rotation stopper projection 61 of the nut 60' in the guide slit 84 of the cover (housing) 80, the nut 60' can be engaged with the cover (housing) 80 unrotatably, and only by bringing the annular projection portion 62' of the nut 60' into contact with the flat face 34b' formed at the contact portion 34' of the lens frame 30, the nut 60' and the contact portion 34' can be brought into partial contact (here, annular linear contact) with each other.

That is, according to the unit, while simplification of the structure, size reduction, facilitation of assembling and the like are achieved, even if the nut 60' screwed with the lead screw 50 generates slight vibration, transmission of the vibration to the lens frame 30 can be prevented, and the lens frame 30 (lens G2) can be driven stably and accurately in the optical axis direction L without vibration.

As mentioned above, according to the lens driving unit of the present invention, while simplification of the structure, size reduction and the like are achieved, even if the nut screwed with the lead screw generates slight vibration, transmission of the vibration to the lens frame can be prevented, and a lens driving unit which can drive the lens frame (lens) stably and accurately in the optical axis direction without vibration can be obtained.

In the above embodiments, the single lens frame 30 is shown as a lens frame moving in the optical axis direction L, but not limited to this, the present invention can be applied to structure provided with a plurality of lens frames.

In the above embodiments, the annular projection portions 34b, 62' are employed for bringing the contact portions 34, 34' of the lens frame 30 and the nuts 60, 60' into partial contact in the projected plane of the nuts 60, 60' in the optical axis direction L, but not limited to this, the projection may be scattered and the sectional shape is not limited to a curved shape but may be other shapes as long as it is formed in a convex state.

Since the lens driving unit of the present invention can prevent transmission of vibration from the nut to the lens frame while achieving simplification of the structure, size reduction and the like, the present invention can be applied not only to an optical pick-up unit and the like but also useful to other lens optical systems as long as vibration itself of the lens frame should be prevented.

What is claimed is:

1. A lens driving unit comprising:
a housing;
a driving source fixed to the housing;
a lead screw extending in an optical axis direction and being configured to be rotated and driven by the driving source;
a nut configured to be screwed with the lead screw;
a lens frame holding a lens and supported movably in the optical axis direction;
a contact portion provided at the lens frame so as to be brought into contact with the nut from one end side of the optical axis direction; and
a spring urging at least one of the nut and the contact portion so that the nut and the contact portion are brought into contact with each other,
wherein the nut is unrotatably and movably engaged with the housing, the nut being moveably engaged with the housing in the optical axis direction; and
wherein the contact portion and the nut are configured so as to be brought into partial contact with each other in a projected plane of the nut in the optical axis direction.

2. The lens driving unit according to claim 1, wherein the housing has a guide slit configured to bring about a guide action in the optical axis direction;
the nut has a rotation stopper projection to be inserted into the guide slit;
the contact portion has an annular projection portion projecting annularly in the optical axis direction; and
the nut has a flat face in contact with the annular projection portion.

3. The lens driving unit according to claim 2, wherein the annular projection portion includes a section curved in a convex state.

4. The lens driving unit according to claim 1, wherein the housing has a guide slit configured to bring about a guide action in the optical axis direction;
the nut has a rotation stopper projection to be inserted into the guide slit;
the nut has an annular projection portion projecting annularly in the optical axis direction; and
the contact portion has a flat face in contact with the annular projection portion.

5. The lens driving unit according to claim 4, wherein the annular projection portion includes a section curved in a convex state.

6. The lens driving unit according to claim 4, wherein the annular projection portion is disposed on both faces of the nut in the optical axis direction.

7. The lens driving unit according to claim 6, wherein the annular projection portion includes a section curved in a convex state.

* * * * *